United States Patent
Yeh

(10) Patent No.: US 9,037,781 B2
(45) Date of Patent: May 19, 2015

(54) METHOD FOR MANAGING BUFFER MEMORY, MEMORY CONTROLLER, AND MEMORY STORAGE DEVICE

(75) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 600 days.

(21) Appl. No.: 13/472,485

(22) Filed: May 16, 2012

(65) Prior Publication Data

US 2013/0179627 A1 Jul. 11, 2013

(30) Foreign Application Priority Data

Jan. 9, 2012 (TW) .............................. 101100822 A

(51) Int. Cl.
*G06F 12/00* (2006.01)
*G06F 3/06* (2006.01)
*G06F 13/16* (2006.01)
*G06F 12/02* (2006.01)
*G06F 12/08* (2006.01)

(52) U.S. Cl.
CPC ............ *G06F 3/0656* (2013.01); *G06F 3/0604* (2013.01); *G06F 13/1673* (2013.01); *G06F 12/0246* (2013.01); *G06F 2212/7203* (2013.01); *G06F 12/08* (2013.01); *G06F 3/061* (2013.01); *G06F 3/0679* (2013.01)

(58) Field of Classification Search
CPC ... G06F 3/0604; G06F 3/0656; G06F 3/0679; G06F 12/0246; G06F 13/1673; G06F 2212/7203

USPC ............................................. 711/103; 710/56
See application file for complete search history.

(56) References Cited

U.S. PATENT DOCUMENTS

| | | | |
|---|---|---|---|
| 2004/0057299 A1 | 3/2004 | Kozakai et al. | |
| 2010/0088574 A1 | 4/2010 | Kim et al. | |
| 2012/0254522 A1* | 10/2012 | Yeh | 711/103 |
| 2013/0036258 A1* | 2/2013 | Teo | 711/103 |

OTHER PUBLICATIONS

"Office Action of Taiwan Counterpart Application", issued on Jan. 22, 2015, p. 1-p. 12.

* cited by examiner

*Primary Examiner* — Aracelis Ruiz
(74) *Attorney, Agent, or Firm* — Jianq Chyun IP Office

(57) ABSTRACT

A method for managing a buffer memory in a memory storage device is provided, wherein the memory storage device has a rewritable non-volatile memory module. The method includes transmitting temporary data from the buffer memory to a buffer area of the rewritable non-volatile memory module by using a pre-programmed command set, wherein the temporary data is not programmed into a storage area of the rewritable non-volatile memory module. The method also includes releasing a storage space storing the temporary data in the buffer memory and reloading the temporary data from the buffer area into the storage space of the buffer memory. Thereby, the method can temporarily increase available storage space of the buffer memory to meet the demand of additional operations.

23 Claims, 6 Drawing Sheets

US 9,037,781 B2

METHOD FOR MANAGING BUFFER MEMORY, MEMORY CONTROLLOR, AND MEMORY STORAGE DEVICE

CROSS-REFERENCE TO RELATED APPLICATION

This application claims the priority benefit of Taiwan application serial no. 101100822, filed on Jan. 9, 2012. The entirety of the above-mentioned patent application is hereby incorporated by reference herein and made a part of this specification.

BACKGROUND

1. Technology Field

The present invention generally relates to a technique for managing a buffer memory, and more particularly, to a buffer memory management method which can temporarily increase the storage space of a buffer memory and a memory controller and a memory storage device using the same.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, notebook computers) due to its many characteristics such as data non-volatility, low power consumption, small volume, non-mechanical structure, and high access speed. A solid state drive (SSD) is a memory storage device which uses a flash memory as its storage medium. Thus, in recent years, the flash memory industry has become a major part of the electronic industry.

In a memory storage device which uses a rewritable non-volatile memory as its storage medium, a buffer memory is usually disposed for temporarily storing program codes or data. In consideration of cost, such a buffer memory usually has a limited storage space. A memory storage device cannot work properly when the storage space of its buffer memory runs out. Additional memory space is required when a memory storage device executes some programs. For example, a memory space having a capacity of log(n) is required for sorting data having a size of n. Aforementioned sorting procedure cannot be executed if the storage space of a buffer memory is insufficient. Thereby, how to instantly and temporarily release the storage space of a buffer memory has become a major subject in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a buffer memory management method, a memory controller, and a memory storage device, in which the storage space of a buffer memory can be instantly and temporarily increased.

According to an exemplary embodiment of the present invention, a method for managing a buffer memory of a memory storage device is provided, wherein the memory storage device has a rewritable non-volatile memory module, and the rewritable non-volatile memory module has a buffer area and a storage area. The method includes transmitting temporary data from the buffer memory to the buffer area by using a pre-programmed command set. According to the pre-programmed command set, the rewritable non-volatile memory module does not program the temporary data into the storage area. The method also includes releasing a storage space for storing the temporary data in the buffer memory. The method further includes reloading the temporary data from the buffer area of the rewritable non-volatile memory module into the storage space of the buffer memory.

According to an exemplary embodiment of the present invention, a memory controller for controlling a rewritable non-volatile memory module is provided, wherein the rewritable non-volatile memory module has a buffer area and a storage area. The memory controller includes a host interface, a memory interface, a buffer memory, and a memory management circuit. The host interface is configured to couple to a host system. The memory interface is configured to couple to the rewritable non-volatile memory module. The memory management circuit is coupled to the host interface, the memory interface, and the buffer memory. The memory management circuit transmits a temporary data from the buffer memory to the buffer area by using a pre-programmed command set. According to the pre-programmed command set, the rewritable non-volatile memory module does not program the temporary data into the storage area. The memory management circuit also releases a storage space for storing the temporary data in the buffer memory. The memory management circuit further reloads the temporary data from the buffer area of the rewritable non-volatile memory module into the storage space of the buffer memory.

According to an exemplary embodiment of the present invention, a memory storage device including a connector, a rewritable non-volatile memory module, and a memory controller is provided. The connector is configured to couple to a host system. The rewritable non-volatile memory module has a buffer area and a storage area. The memory controller is coupled to the connector and the rewritable non-volatile memory module and has a buffer memory. The memory controller transmits a temporary data from the buffer memory to the buffer area by using a pre-programmed command set. According to the pre-programmed command set, the rewritable non-volatile memory module does not program the temporary data into the storage area. The memory controller releases a storage space for storing the temporary data in the buffer memory. The memory controller further reloads the temporary data from the buffer area of the rewritable non-volatile memory module into the storage space of the buffer memory.

As described above, exemplary embodiments of the present invention provide a buffer memory management method, a memory controller, and a memory storage device which can temporarily release the storage space of a buffer memory. In addition, because the time required for temporarily storing data into the buffer area of a rewritable non-volatile memory module is shorter than the time required for temporarily storing the data into the storage area of the rewritable non-volatile memory module, available storage space of the buffer memory can be instantly and temporarily increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
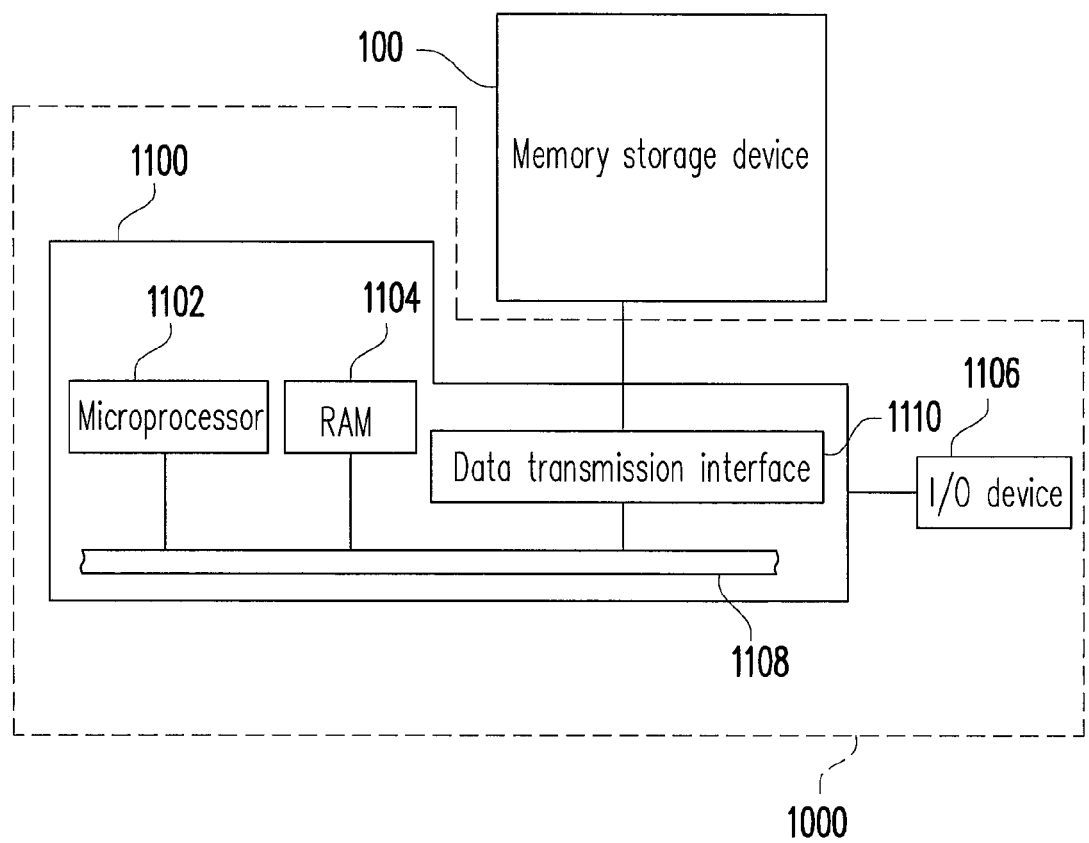
FIG. 1A illustrates a host system and a memory storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also referred to as a memory storage system) includes a rewritable non-volatile memory module and a controller (also referred to as a control circuit). A memory storage device is usually used along with a host system so that the host system can write data into or read data from the memory storage device.

FIG. 1A illustrates a host system and a memory storage device according to an exemplary embodiment of the invention.

Figure 1B:
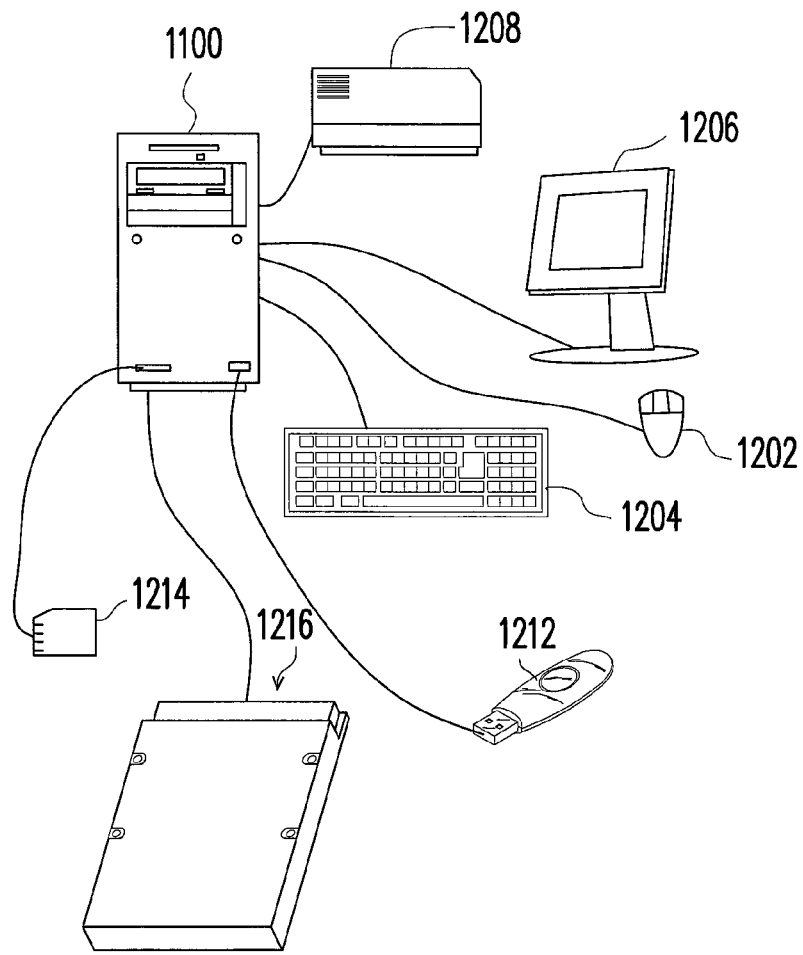
FIG. 1B is a diagram of a computer, an input/output (I/O) device, and a memory storage device according to an exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/0 device 1106 is not limited to the components illustrated in FIG. 1B and may further include other components.

In the present embodiment, a memory storage device 100 is coupled to other components of the host system 1000 through the data transmission interface 1110. Data can be written into or read from the memory storage device 100 through the operations of the microprocessor 1102, the RAM 1104, and the I/O device 1106. The memory storage device 100 may be a rewritable non-volatile memory storage device, such as the flash drive 1212, the memory card 1214, or the solid state drive (SSD) 1216 illustrated in FIG. 1B.

Figure 1C:
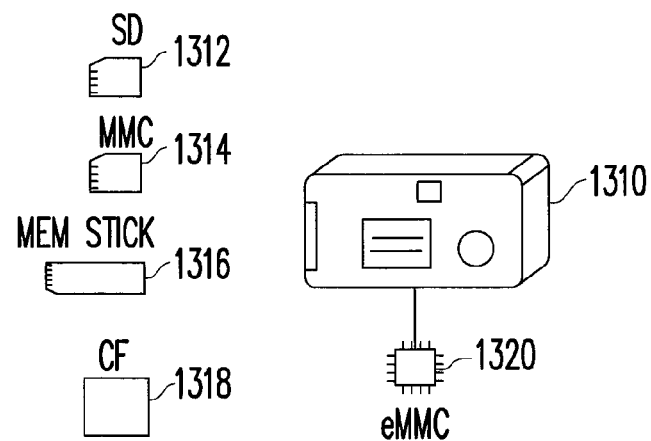
FIG. 1C is a diagram of a host system and a memory storage device according to an exemplary embodiment of the present invention.

Generally speaking, the host system 1000 may be substantially any system that can work with the memory storage device 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that an eMMC is directly coupled to the motherboard of a host system.

Figure 2A:
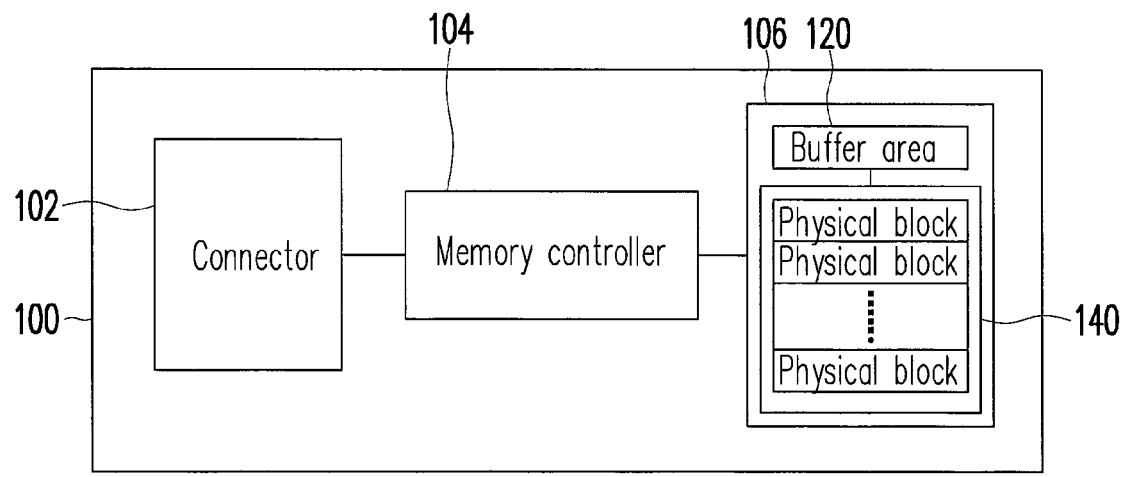
FIG. 2A is a schematic block diagram of the memory storage device in FIG. 1A.

FIG. 2A is a schematic block diagram of the memory storage device in FIG. 1A.

Referring to FIG. 2A, the memory storage device 100 includes a connector 102, a memory controller 104, and a rewritable non-volatile memory module 106.

In the present exemplary embodiment, the connector 102 complies with the serial advanced technology attachment (SATA) standard. However, the invention is not limited thereto, and the connector 102 may also comply with the parallel advanced technology attachment (PATA) standard, the Institute of Electrical and Electronic. Engineers (IEEE) 1394 standard, the peripheral component interconnect (PCI) express standard, the universal serial bus (USB) standard, the SD interface standard, the MS interface standard, the MMC interface standard, the CF interface standard, the integrated device electronics (IDE) standard or any other suitable standard.

The memory controller 104 executes a plurality of logic gates or control instructions implemented in a hardware form or a firmware form and performs various data operations on the rewritable non-volatile memory module 106 according to commands issued by the host system 1000.

The rewritable non-volatile memory module 106 is coupled to the memory controller 104 and configured to store data written by the host system 1000. Besides, the rewritable non-volatile memory module 106 has a buffer area 120 and a storage area 140.

Figure 2B:
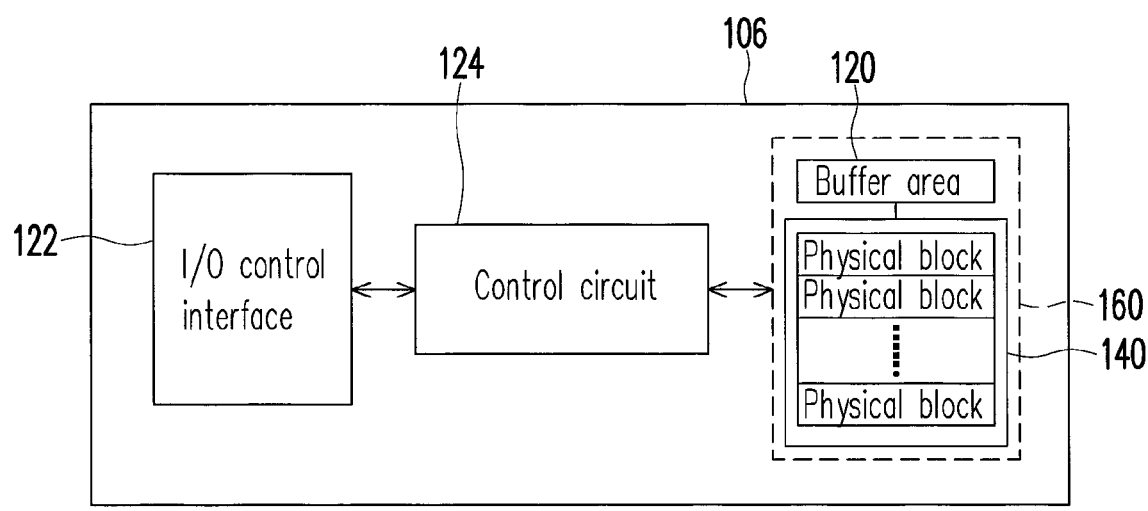
FIG. 2B is a block diagram of a rewritable non-volatile memory module according to an exemplary embodiment of the present invention.

FIG. 2B is a block diagram of a rewritable non-volatile memory module according to an exemplary embodiment of the invention.

Referring to FIG. 2B, in an exemplary embodiment, the rewritable non-volatile memory module 106 further includes an I/O control interface 122, a control circuit 124, and at least one memory chip (not shown), each memory chip includes a plurality of memory dies (for example, memory dies 160), and each memory die includes a plurality of physical blocks. The I/O control interface 122 receives commands and data from the memory controller 104. The control circuit 124 controls the overall operation of the rewritable non-volatile memory module 106 (for example, writes data into the buffer area 120 and the storage area 140). In the present exemplary embodiment, the buffer area 120 and the storage area 140 are configured in the same memory chip. In an exemplary embodiment, the buffer area 120 and the storage area 140 belong to the same memory die 160. However, the invention is not limited thereto, and in other exemplary embodiments, the buffer area 120 and the storage area 140 may also belong to different memory dies.

The buffer area 120 is used for temporarily storing data from the memory controller 104 or data in the storage area 140. To be specific, the process of writing data into the rewritable non-volatile memory module 106 includes an operation for transmitting the data and an operation for programming the data. Regarding the data transmission operation, the memory management circuit 202 of the memory controller 104 transmits the data to be written to the buffer area 120. Regarding the data programming operation, the data is programmed from the buffer area 120 to the storage area 140. In an exemplary embodiment, the buffer area 120 is a volatile memory, such as a dynamic random access memory (DRAM). However, the buffer area 120 may also be a static random access memory (SRAM), a magnetoresistive random access memory (MRAM), a cache RAM, a synchronous dynamic random access memory (SDRAM), a video RAM (VRAM), an embedded DRAM (eDRAM), or any other volatile memory. In another exemplary embodiment, the buffer area 120 is a non-volatile memory, such as a NOR flash memory.

The storage area 140 has a plurality of physical blocks. These physical blocks may belong to the same memory die or different memory dies. Each physical block has a plurality of physical pages, and each physical page has at least one physical sector. Physical pages belonging to the same physical block can be individually written but have to be erased all together. For example, each physical block is composed of 128 physical pages, and each physical page has 8 physical sectors. Namely, in the case that each physical sector has 512 bytes, the capacity of each physical page is 4 kilobytes (KB). However, the present invention is not limited thereto, and each physical block may also be composed of 64 physical pages, 256 physical pages, or any other number of physical pages.

To be specific, physical block is the smallest unit for erasing data. Namely, each physical block contains the least number of memory cells that are erased together. Physical page is the smallest unit for programming data. Namely, physical page is the smallest unit for writing data. Each physical page usually includes a data bit area and a redundant bit area, wherein the data bit area is used for storing user data, and the redundant bit area is used for storing system data (for example, error checking and correcting (ECC) codes).

In the present exemplary embodiment, the rewritable non-volatile memory module 106 is a multi level cell (MLC) NAND flash memory module (i.e., each memory cell stores at least two bit data). However, the invention is not limited thereto, and the rewritable non-volatile memory module 106 may also be a single level cell (SLC) NAND flash memory module, any other flash memory module, or any other memory module with the same characteristic.

Figure 3:
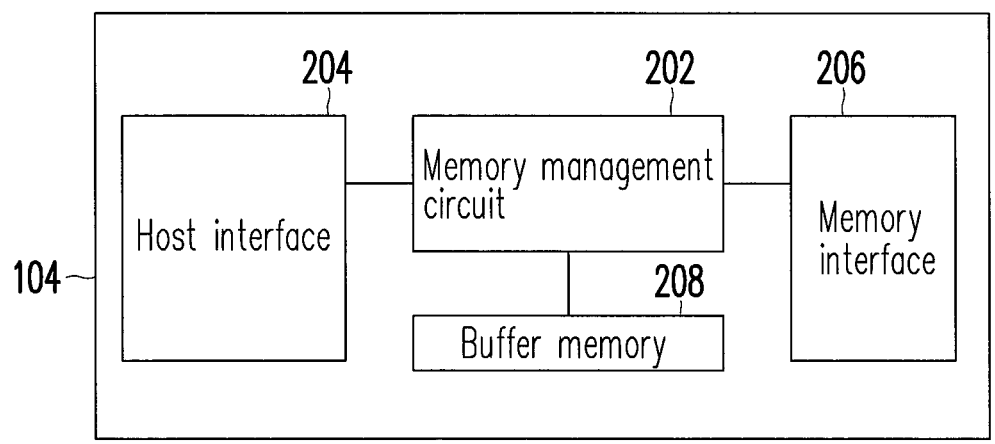
FIG. 3 is a schematic block diagram of a memory controller according to an exemplary embodiment of the present invention.

FIG. 3 is a schematic block diagram of a memory controller according to an exemplary embodiment of the present invention.

Referring to FIG. 3, the memory controller 104 includes a memory management circuit 202, a host interface 204, a memory interface 206, and a buffer memory 208.

The memory management circuit 202 controls the overall operation of the memory controller 104. To be specific, the memory management circuit 202 has a plurality of control instructions, and when the memory storage device 100 is in operation, the control instructions are executed to perform various data operations.

In the present exemplary embodiment, the control instructions of the memory management circuit 202 are implemented in a firmware form. For example, the memory management circuit 202 has a microprocessor unit (not shown) and a read-only memory (ROM), and the control instructions are burnt in the ROM. When the memory storage device 100 is in operation, the control instructions are executed by the microprocessor unit to carry out various data operations.

In another exemplary embodiment of the invention, the control instructions of the memory management circuit 202 may also be stored in a specific area of the rewritable non-volatile memory module 106 (for example, a system area exclusively used for storing system data in a memory module) as program codes. For example, the memory management circuit 202 has a microprocessor unit (not shown), a ROM (not shown), and a RAM (not shown). In particular, the ROM has a boot code, and when the memory controller 104 is enabled, the microprocessor unit first executes the boot code to load the control instructions from the rewritable non-volatile memory module 106 into the RAM of the memory management circuit 202. Thereafter, the microprocessor unit runs the control instructions to perform various data operations.

In another exemplary embodiment of the present invention, the control instructions of the memory management circuit 202 may also be implemented in a hardware form. For example, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit manages the physical blocks of the rewritable non-volatile memory module 106. The memory writing unit gives write commands to the rewritable non-volatile memory module 106 to write data into the rewritable non-volatile memory module 106. The memory reading unit gives read commands to the rewritable non-volatile memory module 106 to read data from the rewritable non-volatile memory module 106. The memory erasing unit gives erase commands to the rewritable non-volatile memory module 106 to erase data from the rewritable non-volatile memory module 106. The data processing unit processes data to be written into or read from the rewritable non-volatile memory module 106.

The host interface 204 is coupled to the memory management circuit 202 and configured to receive and identify commands and data from the host system 1000. Namely, commands and data from the host system 1000 are transmitted to the memory management circuit 202 through the host interface 204. In the present exemplary embodiment, the host interface 204 complies with the SATA standard. However, the invention is not limited thereto, and the host interface 204 may also comply with the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

The buffer memory 208 is used for temporarily storing program codes or data of the memory management circuit 202. The buffer memory 208 is a SRAM. However, the buffer memory 208 may also be a DRAM, a MRAM, a cache RAM, a SDRAM, a VRAM, a NOR flash memory, an eDRAM, or any other memory.

In an exemplary embodiment, the memory controller 104 further includes a power management circuit and an ECC circuit (not shown). The power management circuit is coupled to the memory management circuit 202 and configured to control the power supply of the memory storage device 100. The ECC circuit is coupled to the memory management circuit 202 and configured to execute an ECC procedure to ensure data accuracy. To be specific, when the host interface 204 receives a write command from the host system 1000, the ECC circuit generates a corresponding ECC code for a data (also referred to as an update data) corresponding to the write command, and the memory management circuit 202 writes the update data and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit executes the ECC procedure on the data according to the ECC code.

In the present exemplary embodiment, the memory management circuit 202 cannot work properly when the storage space of the buffer memory 208 is insufficient. For example, when the memory management circuit 202 is about to sort a global random table, it requires additional storage space for storing the content of the global random table. To be specific, the global random table records the mapping relationship between a logical access unit and a physical access unit. In an exemplary embodiment, the logical access unit is logical page, and the physical access unit is physical page. When the memory controller 104 keeps writing data into a physical page of the rewritable non-volatile memory module 106 with a block-based mapping relationship (a logical block is mapped to a physical block), the physical blocks for writing data have to be merged constantly. As a result, the writing efficiency is reduced. Thus, the memory controller 104 uses a page-based mapping relationship (a logical page is mapped to a physical page) and maintains a global random table for recording the page-based mapping relationship. However, the page-based mapping relationship results in more mapped pairs, and accordingly a more complicated global random table, than the block-based mapping relationship. In order to maintain and effectively access the global random table, the memory controller 104 sorts information in the global random table from time to time. Additional memory space is required in a general sorting procedure. For example, if data having a size of n is sorted through quick sort, an additional memory space having a capacity of log(n) is required for executing the sorting algorithm. Thus, when the storage space of the buffer memory 208 is not enough for executing the sorting algorithm of the global random table, the memory management circuit 202 has to temporarily release part of the storage space of the buffer memory 208 to execute the sorting procedure.

Figure 4:
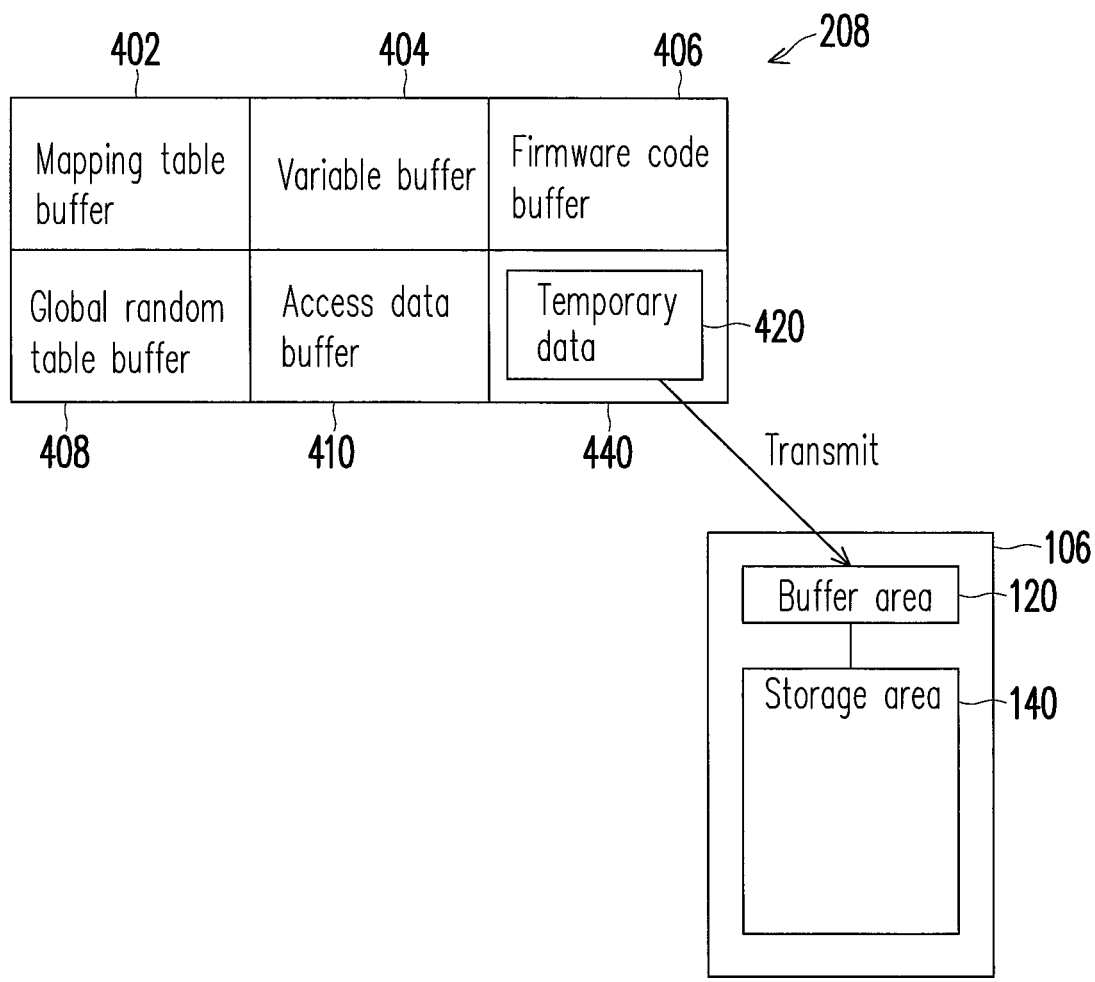
FIG. 4 is a diagram illustrating how a part of the storage space of a buffer memory is released according to an exemplary embodiment of the present invention.

FIG. 4 is a diagram illustrating how a part of the storage space of a buffer memory is released according to an exemplary embodiment of the present invention.

Referring to FIG. 4, generally, the memory management circuit 202 of the memory controller 104 divides the storage space of the buffer memory 208 into a plurality of areas for storing data. For example, the memory management circuit 202 divides the buffer memory 208 into a mapping table buffer 402, a variable buffer 404, a firmware code buffer 406, a global random table buffer 408, an access data buffer 410, and a remaining buffer, and a temporary data 420 is stored in the remaining buffer (i.e., a storage space 440). In the present exemplary embodiment, the mapping table buffer 402 is used for temporarily storing at least a part of a mapping table, wherein the mapping table is used for storing the mapping relationship between logical addresses and physical addresses. The variable buffer 404 is used for storing at least one variable used by the memory management circuit 202 during the operation thereof. The firmware code buffer 406 is used for storing at least one program code executed by the memory management circuit 202. The global random table buffer 408 is used for temporarily storing at least a part of the global random table. The access data buffer 410 is used for temporarily storing data to be written into or read from the rewritable non-volatile memory module 106.

As described above, the storage space of the buffer memory 208 is configured in advance to temporarily store programs or data during the operation of the memory storage device 100. Thus, when aforementioned sorting procedure of the global random table is to be executed, the memory management circuit 202 has to release the storage space of the buffer memory 208. For example, in the present exemplary embodiment, the memory management circuit 202 first transmits the temporary data 420 from the buffer memory 208 into the buffer area 120 of the rewritable non-volatile memory module 106 by using a command set, and the command set does not require the temporary data 420 to be programmed into the storage area 140.

To be specific, in the present exemplary embodiment, the memory management circuit 202 transmits the temporary data 420 from the buffer memory 208 to the buffer area 120 by using a pre-programmed command set. The pre-programmed command set may be composed of a "write command" field, an "address" field, and a "data" field, wherein the "write command" field instructs the rewritable non-volatile memory module 106 that the command is a write command, the "address" field records the memory address for writing data, and the "data" field records the content of the data to be written. It should be noted that in a general data access operation, besides aforementioned "write command" field, "address" field, and "data" field, a write command further includes an "execute command" field corresponding to the "write command" field, wherein the "execute command" field instructs the rewritable non-volatile memory module 106 to program the data into the storage area 140. While in the present exemplary embodiment, the pre-programmed command set used by the memory management circuit 202 does not include the "execute command" field corresponding to the "write command" field. Thus, after the rewritable non-volatile memory module 106 receives the pre-programmed command set, it does not program the temporary data 420 into the storage area 140. On the other hand, because the rewritable non-volatile memory module 106 does not program the temporary data 420 into the storage area 140, the time for the rewritable non-volatile memory module 106 to execute the programming operation is saved. In other words, the memory controller 104 can quickly transmit the temporary data 420 to the rewritable non-volatile memory module 106 to release the storage space 440 and make it available.

After the memory management circuit 202 transmits the temporary data 420 to the buffer area 120, the memory management circuit 202 releases the storage space 440 of the buffer memory 208. Namely, the memory management circuit 202 can write new data into the storage space 440. Herein the temporary data 420 in the storage space 440 may be overwritten by the new data. Then the memory management circuit 202 can sort information recorded in the global random table by using the storage space 440. After the memory management circuit finishes sorting the global random table, the memory management circuit 202 reloads the temporary data 420 from the buffer area 120 of the rewritable non-volatile memory module 106 into the storage space 440 of the buffer memory 208. To be specific, the memory management circuit 202 reads the temporary data 420 from the buffer area 120 of the rewritable non-volatile memory module 106 to the storage space 440 of the buffer memory 208 by using a buffer area read command. The buffer area read command may be composed of a "read command" field, a "column address" field, and an "execute command" field corresponding to the "read command" field. Herein the "read command" field instructs the rewritable non-volatile memory module 106 that the command is a read command and data is to be read, the "column address" field records the column address of the data to be read, and the "execute command" field corresponding to the "read command" field tells the rewritable non-volatile memory module 106 to read data. In particular, according to the buffer area read command, the rewritable non-volatile memory module 106 does not read data from the storage area 140 but simply provides data in the buffer area 120 to the memory management circuit 202. Accordingly, after receiving the buffer area read command, the rewritable non-volatile memory module 106 transmits the temporary data 420 from the memory address corresponding to the data in the buffer area 120 to the memory controller 104, and the memory management circuit 202 loads the data into the storage space 440 of the buffer memory 208. Thereby, the procedure of temporarily increasing available storage space of the buffer memory 208 is accomplished.

In another exemplary embodiment, during the period when the temporary data 420 is stored in the buffer area 120, the memory management circuit 202 stops accessing data in the storage area 140 of the rewritable non-volatile memory module 106. To be specific, because all data is temporarily stored in the buffer area 120 while accessing the storage area 140, the memory management circuit 202 stops accessing data in the storage area 140 during the period when the temporary data 420 is stored in the buffer area 120 to prevent the temporary data 420 in the buffer area 120 from being overwritten.

It should be noted that in the present exemplary embodiment, after the memory controller 104 transmits the temporary data 420 to the buffer area 120, it sorts the global random table by using the storage space 440. However, the purpose of the storage space 440 is not limited in the present invention, and in other exemplary embodiments, the memory controller 104 may also execute other programs by using the storage space 440. For example, the memory controller 104 may further determine whether to execute a specific task or whether the space of the buffer memory 208 is insufficient. The specific task may be a sorting procedure of the global random table. However, the content of the specific task is not limited in the invention. If the specific task is to be executed, the memory controller 104 releases the storage space 440 to execute the specific task. Or, when the memory controller 104 determines that the space of the buffer memory 208 is insufficient, it releases the storage space 440. On the other hand, the memory controller 104 may also transmit any data in the buffer memory 208 to the buffer area 120 as the temporary data 420, so as to temporarily increase available storage space of the buffer memory 208. The content of the temporary data 420 is not limited in the invention. Or, the memory controller 104 may release the storage space of any area (for example, the variable buffer 404) in the buffer memory 208. The position of the released memory space is not limited in the invention.

Figure 5:
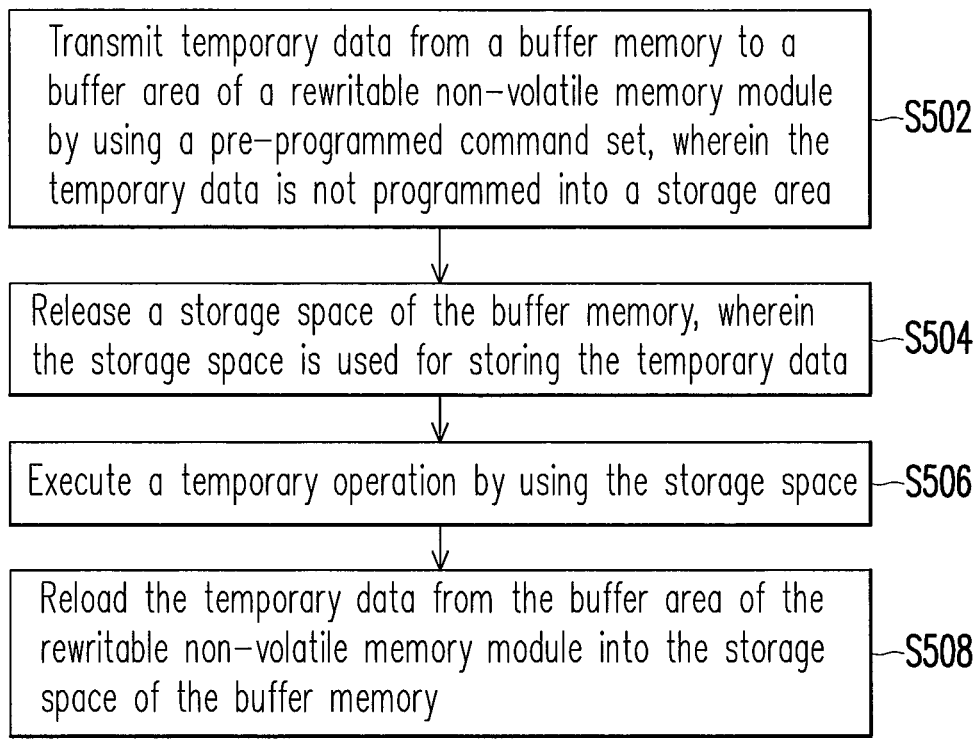
FIG. 5 is a flowchart of a buffer memory management method according to an exemplary embodiment of the present invention.

FIG. 5 is a flowchart of a buffer memory management method according to an exemplary embodiment of the invention.

Referring to FIG. 5, in step S502, the memory management circuit 202 of the memory controller 104 transmits the temporary data from the buffer memory 208 to the buffer area 120 of the rewritable non-volatile memory module 106, wherein the temporary data is not programmed into the storage area 140 of the rewritable non-volatile memory module 106. In step S504, the memory management circuit 202 releases a storage space in the buffer memory 208 for storing the temporary data. Next, in step S506, the memory management circuit 202 performs a temporary operation (for example, executes the sorting procedure of the global random table) by using the storage space. In the last step S508, the memory management circuit 202 reloads the temporary data from the buffer area 120 of the rewritable non-volatile memory module 106 into the storage space of the buffer memory 208. The steps in FIG. 5 have been described above in detail therefore will not be described herein.

As described above, in a buffer memory management method, a memory controller, and a memory storage device provided by exemplary embodiments of the invention, the temporary data is transmitted from the buffer memory to the buffer area by using a pre-programmed command set, and the temporary data is not programmed into the storage area of the rewritable non-volatile memory module. Thus, the storage space in the buffer memory which is originally used for storing the temporary data can be released and used for executing other programs of the memory controller. In particular, compared to moving data to the storage area of the rewritable non-volatile memory module, temporarily storing the temporary data into the buffer area of the rewritable non-volatile memory module requires a shorter time. Thereby, the available storage space of the buffer memory can be temporarily and quickly increased. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A buffer memory management method, for operating a buffer memory of a memory storage device, wherein the memory storage device has a rewritable non-volatile memory module, and the rewritable non-volatile memory module has a buffer area and a storage area, the buffer memory management method comprising:

transmitting temporary data from the buffer memory to the buffer area by using a pre-programmed command set, wherein according to the pre-programmed command set, the rewritable non-volatile memory module does not program the temporary data into the storage area;

releasing a storage space of the buffer memory, wherein the storage space stores the temporary data; and reloading the temporary data from the buffer area of the rewritable non-volatile memory module into the storage space of the buffer memory.

2. The buffer memory management method according to claim 1, wherein the step of releasing the storage space of the buffer memory further comprises:

determining whether a specific task is to be executed or whether a space of the buffer memory is insufficient; and when the specific task is to be executed or the space of the buffer memory is insufficient, releasing the storage space of the buffer memory.

3. The buffer memory management method according to claim 1 further comprising:

before reloading the temporary data from the buffer area of the rewritable non-volatile memory module into the storage space of the buffer memory, sorting information recorded in a global random table by using the storage space.

4. The buffer memory management method according to claim 1, wherein the step of reloading the temporary data from the buffer area of the rewritable non-volatile memory module into the storage space of the buffer memory comprises:

reading the temporary data from the buffer area of the rewritable non-volatile memory module to the storage space of the buffer memory by using a buffer area read command.

5. The buffer memory management method according to claim 1 further comprising:

not accessing data in the storage area of the rewritable non-volatile memory module during a period when the temporary data is stored in the buffer area.

6. The buffer memory management method according to claim 1 further comprising:

dividing the buffer memory into a plurality of buffers, wherein the storage space is one of the buffers.

7. The buffer memory management method according to claim 6, wherein the buffers comprise a mapping table buffer, a variable buffer, a firmware code buffer, a global random table buffer, a access data buffer, and a remaining buffer.

8. A memory controller, for controlling a rewritable non-volatile memory module, wherein the rewritable non-volatile memory module has a buffer area and a storage area, the memory controller comprising:

a host interface, configured to couple to a host system;

a memory interface, configured to couple to the rewritable non-volatile memory module;

a buffer memory; and a memory management circuit, coupled to the host interface, the memory interface, and the buffer memory, wherein the memory management circuit is configured to transmit temporary data from the buffer memory to the buffer area by using a pre-programmed command set, wherein according to the pre-programmed command set, the rewritable non-volatile memory module does not program the temporary data into the storage area, wherein the memory management circuit is further configured to release a storage space of the buffer memory, wherein the storage space stores the temporary data, wherein the memory management circuit is further configured to reload the temporary data from the buffer area of the rewritable non-volatile memory module into the storage space of the buffer memory.

9. The memory controller according to claim 8, wherein the memory management circuit is further configured to determine whether a specific task is to be executed or whether a space of the buffer memory is insufficient, wherein when the specific task is to be executed or the space of the buffer memory is insufficient, the memory management circuit is further configured to release the storage space of the buffer memory.

10. The memory controller according to claim 8, wherein before reloading the temporary data from the buffer area of the rewritable non-volatile memory module into the storage space of the buffer memory, the memory management circuit is further configured to sort information recorded in a global random table by using the storage space.

11. The memory controller according to claim 8, wherein the memory management circuit is further configured to read the temporary data from the buffer area of the rewritable non-volatile memory module to the storage space of the buffer memory by using a buffer area read command.

12. The memory controller according to claim 8, wherein the memory management circuit does not access data in the storage area of the rewritable non-volatile memory module during a period when the temporary data is stored in the buffer area.

13. The memory controller according to claim 8, wherein the memory management circuit is further configured to divide the buffer memory into a plurality of buffers, and the storage space is one of the buffers.

14. The memory controller according to claim 13, wherein the buffers comprise a mapping table buffer, a variable buffer, firmware code buffer, a global random table buffer, a access data buffer, and a remaining buffer.

15. A memory storage device, comprising:

a connector, configured to couple to a host system;

a rewritable non-volatile memory module, comprising a buffer area and a storage area; and a memory controller, coupled to the connector and the rewritable non-volatile memory module, and comprising a buffer memory, wherein the memory controller is configured to transmit temporary data from the buffer memory to the buffer area by using a pre-programmed command set, and according to the pre-programmed command set, the rewritable non-volatile memory module does not program the temporary data into the storage area, wherein the memory controller is further configured to release a storage space of the buffer memory, wherein the storage space stores the temporary data, wherein the memory controller is further configured to reload the temporary data from the buffer area of the rewritable non-volatile memory module into the storage space of the buffer memory.

16. The memory storage device according to claim 15, wherein the memory controller is further configured to determine whether a specific task is to be executed or whether a space of the buffer memory is insufficient, and when the specific task is to be executed or the space of the buffer memory is insufficient, the memory controller is further configured to release the storage space of the buffer memory.

17. The memory storage device according to claim 15, wherein before reloading the temporary data from the buffer area of the rewritable non-volatile memory module into the storage space of the buffer memory, the memory controller is further configured to sort information recorded in a global random table by using the storage space.

18. The memory storage device according to claim 15, wherein the memory controller reads the temporary data from the buffer area of the rewritable non-volatile memory module to the storage space of the buffer memory by using a buffer area read command.

19. The memory storage device according to claim 15, wherein the memory controller does not access data in the storage area of the rewritable non-volatile memory module during a period when the temporary data is stored in the buffer area.

20. The memory storage device according to claim 15, wherein the memory controller is further configured to divide the buffer memory into a plurality of buffers, and the storage space is one of the buffers.

21. The memory storage device according to claim 20, wherein the buffers comprise a mapping table buffer, a variable buffer, a firmware code buffer, a global random table buffer, a access data buffer, and a remaining buffer.

22. The memory storage device according to claim 15, wherein the rewritable non-volatile memory module further comprises a plurality of memory chips, and each of the memory chips comprises a plurality of memory dies, wherein the buffer area and the storage area are disposed in the same memory chip.

23. The memory storage device according to claim 15, wherein the rewritable non-volatile memory module further comprises a plurality of memory chips, and each of the memory chips comprises a plurality of memory dies, wherein the buffer area and the storage area are disposed in the same memory die.

* * * * *